Jan. 6, 1959  H. B. DRAPEAU  2,867,383
SLEEVE VALVE WATERLINE THERMOSTAT
Filed Nov. 9, 1954  2 Sheets-Sheet 1
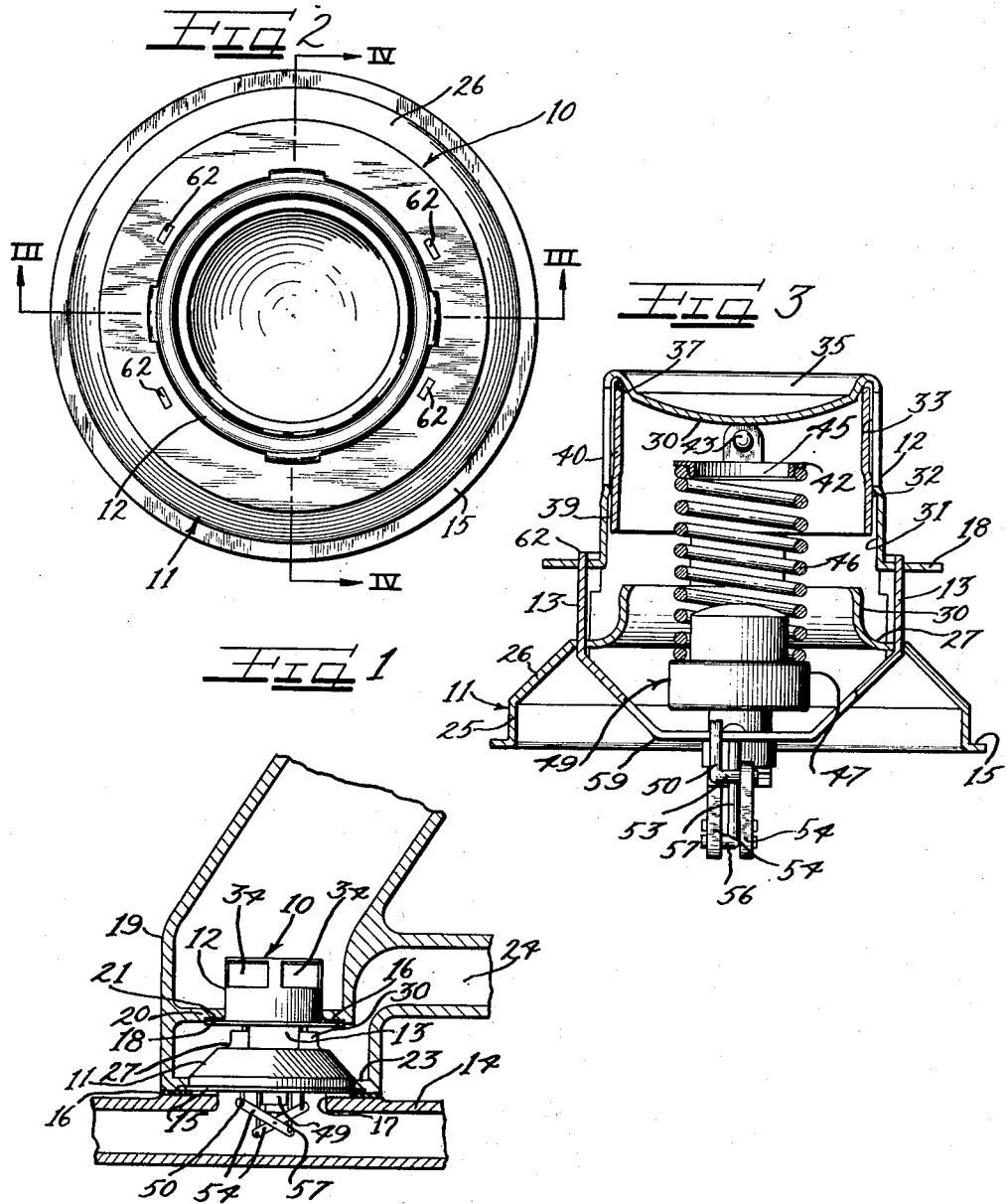
Inventor
HAROLD B. DRAPEAU Jan. 6, 1959   H. B. DRAPEAU   2,867,383
SLEEVE VALVE WATERLINE THERMOSTAT
Filed Nov. 9, 1954   2 Sheets-Sheet 2
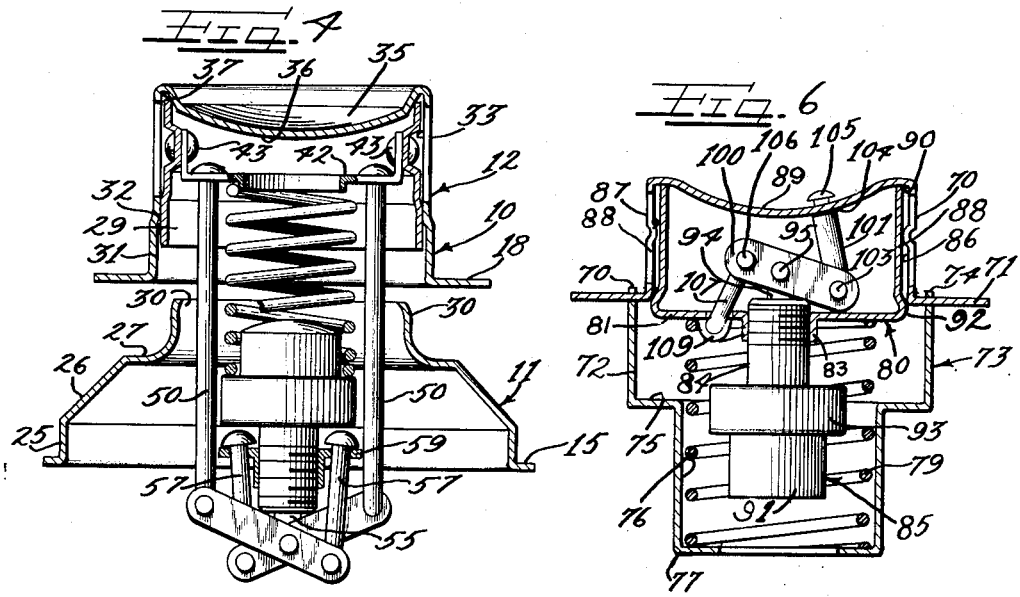
Inventor
HAROLD B. DRAPEAU

United States Patent Office 2,867,383
Patented Jan. 6, 1959

2,867,383

SLEEVE VALVE WATERLINE THERMOSTAT

Harold B. Drapeau, Oak Park, Ill., assignor to The Dole Valve Company, Chicago, Ill., a corporation of Illinois Application November 9, 1954, Serial No. 467,805

10 Claims. (Cl. 236—34.5)

This invention relates to improvements in thermostatically operated valves, particularly adapted for use in pressurized cooling systems for internal combustion engines.

In recent years, the engine temperatures of internal combustion engines and the temperature of the coolant supplied to the hot water heater for heating the passenger compartment of automotive vehicles, have been controlled by the use of thermostatic butterfly valves operated by wax or power types of thermostatic elements having an extensible piston connected with the butterfly valve for moving the same to an open position upon certain predetermined increases in temperature.

Such valves have also been used in by-pass cooling systems in which a bypass valve is operable to by-pass coolant past the radiator when the butterfly valve is closed.

Butterfly valves, however, are unbalanced and tend toward excessive leakage at the extreme high pump pressures, resulting in semi-warm up, and also require considerable power to operate.

An object of my present invention is to remedy the disadvantages of the butterfly types of valves for controlling the temperature of the coolant for internal combustion engines by providing a simple and efficient arrangement of balanced valve operated by the power element of a wax or power type of theremostatic device.

Another object of my invention is to provide a novel and improved form of thermostatic valve for the cooling systems of internal combustion engines, utilizing a sleeve valve for shutting off the flow of coolant until the temperature of the internal combustion engine reaches the required running temperature thereof.

Still another object of my invention is to provide a novel form of thermostatically operated by-pass valve for pressurized cooling systems of internal combustion engines utilizing a single sleeve for controlling both the flow of coolant through the radiator and the by-pass of coolant past the radiator until the temperature of the coolant reaches the desired temperature value.

Another and more specific object of my invention is to provide a simplified form of balanced thermostatically operated valve in which a sleeve valve serves both to control the by-pass of fluid past the radiator and the passage of fluid through the radiator, and a single biasing spring serves to bias the valve in position to block the flow of fluid through the radiator and as a return spring for the power member of the thremostatic element.

These and other objects of my invention will appear from time to time as the following specification proceeds and with reference to the accompanying drawings wherein:

Figure 1 is a fragmentary sectional view taken through the water jacket and hose connection fitting of an internal combustion engine, showing a by-pass thermostatic valve in position in the cylinder head of the engine, with the main flow through the cooling radiator closed and the by-pass flow open;

Figure 2 is a top plan view of the valve shown in Figure 1 with the valve removed from the cylinder head;

Figure 3 is a vertical sectional view taken through the valve, substantially along line III—III of Figure 2;

Figure 4 is a vertical sectional view taken through the valve, substantially along line IV—IV of Figure 2, showing the valve in position to accommodate the by-pass of fluid past the radiator and block the flow of coolant through the radiator;

Figure 5 is a sectional view taken along the same line as Figure 4, but showing the valve in position to block the by-pass of coolant past the radiator and to accommodate the flow of coolant through the radiator;

Figure 6 is a transverse sectional view taken through a modified form of thermostatically controlled valve constructed in accordance with my invention; and Figure 7 is a plan view of the valve shown in Figure 6.

In the embodiment of my invention illustrated in the drawings, I have shown in Figure 1 a thermostatically operated by-pass valve 10 having a flanged casing 11 and a flanged valve body 12 secured to said casing and spaced therefrom by spacer straps 13. A flange 15 of the valve casing 11 abuts a gasket 16 on a cylinder head 14 of an internal combustion engine. The valve casing 11 is of an annular form and communicates with an opening 17 in the cylinder head having communication with the water jacket thereof.

The valve 10 is shown as being secured in place over the opening 17 by means of a hose connection fitting 19, suitably secured to the top of the cylinder head. The fitting 19 has an inwardly extending annular wall portion 20 spaced upwardly from the cylinder head and engaging a flange 18 of the valve body 12 and sealed thereto as by a sealing ring or gasket 21. The fitting 19 likewise has an inwardly extending lower annular wall 23 engaging the flange 15 of the valve casing 11 and sealed thereto as by the gasket 16. A by-pass passageway 24 is provided in the fitting 19, to by-pass cooling liquid past the radiator when the valve 10 is closed.

The casing 11 is shown as having a lower cylindrical wall portion 25 extending upwardly from the flange 15 and terminating into an intermediate frusto-conical wall portion 26. The intermediate frusto-conical wall portion 26 terminates into a shoulder 27 forming a seat for the lower end portion of a sleeve valve 29, blocking the by-pass of fluid through the by-pass passageway 24. The shoulder 27 curves upwardly into a generally cylindrical wall portion 30, the interior of which forms a fluid passageway in communication with the valve body 12 and spaced therefrom to form a by-pass port.

The valve body 12, spaced from the discharge end of the valve casing 11 by the spacer straps 13 is shown as having an inner cylindrical wall 31 extending upwardly from the flange 18 and of one diameter for a short portion of its length and diverging inwardly as indicated by reference character 32 to a smaller diameter wall 33 having ports 34 leading therethrough. The wall 33 terminates into an end closure cap 35 for the valve body 12 herein shown as being formed integrally therewith.

The end closure cap 35 is shown as being recessed within the valve body 12 and as forming a convex wall 36 in the interior of said valve body terminating at its edge into an angular wall 37, which may be generally frusto-conical in form, and which uniformly curves into the wall 33. The angle of inclination of the wall 37 is such as will afford a tight seal with the inner periphery of the upper end of the sleeve valve 29.

The sleeve valve 29 is shown as having a lower wall portion 39 converging into a wall portion 40 of smaller diameter than the wall portion 39. The annular surface where the wall portion 39 converges into the wall portion 40 forms in effect a valve seating against the wall portion 33 beneath the ports 34, to prevent the passage of fluid past the outer wall of said valve, as the upper end of the valve sleeve 29 engages the seat formed on the underside of the inclined or frusto-conical wall or seat 37 of the cap 35.

The sleeve valve 29 is also shown as having a recessed central portion 41 within which is carried a transverse bridge 42 on rivets 43. The transverse bridge 42 is shown as having an open central portion 44 having a collar 45 extending downwardly therefrom and forming a seat for a compression spring 46 seated at its opposite end against an enlarged diameter heat conducting ring 47 of a thermostatic element 49. The transverse bridge 42 also forms a connecting means for a pair of links 50 extending therethrough and having heads 51 abutting the top surface of said transverse bridge.

The links 50 are shown as having right angled lower end portions 53 forming pivots for amplifying levers 54, pivoted intermediate their ends to a piston 55 of the thermostatic element 49. The inner ends of the amplifying levers 54 have pivotal connection with right angled ends 56 of reaction links 57 extending through a transverse bridge 59 extending across the central portion of the valve casing 11 and having a cylinder 60 of the thermostatic element 49 threaded therein.

The transverse bridge 59 is shown as being formed integrally with the straps 13 which extend through the shouldered portion 27 of the valve casing, and may be soldered or otherwise secured thereto. The straps 13 are shown as having upwardly projecting nibs 62 extending through the flange 18 and riveted or spun thereto.

The reaction links 57 are provided with heads 61 abutting the upper surface of the bridge 59 and reacting thereagainst to effect movement of the sleeve valve 29 along the valve body 12 into engagement with the shoulder 27 of the valve casing 11, to block the flow of fluid through the by-pass passageway 24 as the valve moves to open the ports 34 to accommodate the flow of coolant through the radiator.

The thermostatic element 49 is of the so-called wax or power type of thermostatic element, the cylinder 60 of which forms a guide for the power member or plunger 55. The power member 55 is abutted at its inner end by a flexible seal or membrane (not shown) containing a fusible thermally expansible material within a casing 63 of the thermostatic element. The fusible material is fusible at the operating range of the thermostatic element and upon fusion thereof extends the power member or piston 55 from the cylinder 60.

The thermally expansible material may be a wax alone, such as a micro-crystalline wax, or may be a micro-crystalline wax in composition with a metal powder and a binder, such as is shown and described in Patent No. 2,259,846 which was issued to Sergius Vernet on October 24, 1941. The thermostatic element itself may be of the same general type as is shown and described in the Vernet Patent No. 2,368,181, dated January 30, 1945. Such types of thermostatic elements are relatively simple and inexpensive and exert a positive driving force against the power member or piston 55, which drives the power member with far more power, a far greater distance than other types of thermostatic elements.

It may be seen from Figures 4 and 5, that as the thermostatic element 49 is subjected to heat, such as the heat of the coolant in the water jacket of an internal combustion engine, and the heat of the coolant approaches the operating range of the thermostatic element, which may be the fusion range of the fusible material contained therein, that the fusible material will expand and extend the power member 55 from the cylinder 60 and pivot the lever arms 54, 54 about their pivots 56 to the reaction links 57. This will draw the links 50, 50 downwardly and move the sleeve valve 29 fom the position shown in Figure 4 to the position shown in Figure 5 to accommodate the flow of coolant to the radiator and block the flow of coolant through the by-pass passageway 24.

In the form of my invention shown in Figures 6 and 7 I have shown a generally cylindrical valve body 70 having a lower outturned flange 71 which may be secured and sealed to the cylinder head or cooling duct of an internal combustion engine in the same manner the casing 11 of the form of my invention shown in Figures 1 through 5 is secured and sealed to the cylinder head of an internal combustion engine.

I have also shown a casing 73 having spaced nibs 74 extending upwardly therefrom through suitable apertured portions (not shown) of the flange 71 and peened or spun thereto. The casing 73 is shown as having an enlarged diameter upper wall portion 72 terminating into an inwardly extending shoulder 75 which in turn terminates into a reduced diameter wall portion 76. The reduced diameter wall portion 76 terminates into an annular inwardly extending shoulder 77 forming a seat for a biasing spring 79 for a sleeve valve 80.

As herein shown, the spring 79 is seated on the shoulder 77 at one end and is seated on a bottom of a spider 81 of the sleeve valve 80 at its opposite end. The spider 81 is shown as having an integrally formed collar 83 having a cylinder 84 of a thermostatic element 85 threaded therein. The valve body 70 has a generally cylindrical wall 86, indented or inwardly pressed intermediate its ends to form an inwardly extending rib 87, engageable with the cylindrical wall of the sleeve valve 80 and forming a guide means for said sleeve valve. The wall 86 is provided with a plurality of ports 88 leading therethrough for the passage of coolant through the radiator, when the valve is opened. The valve body 70 also has a closed top formed by a cap 89 extending thereacross and recessed within said valve body to form a convex inner top wall for said valve body and terminating into a generally annular wall portion 90 adjacent the margin thereof to form a seat for the end of the sleeve valve 80.

The sleeve valve 80 has a generally cylindrical wall, open at its top and curving outwardly at its lower end portion and then turning inwardly and having the spider 81 formed integrally therewith. The outwardly curving portion of the lower end portion of the wall of the valve 80 seats against the inner margin of lower portion of the wall 86 and forms an annular valve 92, to block the passage of fluid past the wall of said valve through the ports 88.

The thermostatic element 85, like the thermostatic element 49 is shown as being a wax type of thermostatic element having a casing 91 containing a thermally expansible fusible material (not shown), and having an enlarged diameter heat conducting ring 93 encircling said casing adjacent the cylinder 84. A power member or piston 94 is carried in the cylinder 84 for extensible movement therefrom upon fusion of the fusible material within the casing 91, and has an outturned upper end 95 pivotally connected to an amplifying lever 100. The amplifying lever 100 is shown as having pivotal connection at one of its ends with a reaction link 101 on an outturned end 103 thereof. The reaction link 101 extends through the cap 89 and has a shouldered portion 104 engaging the undersurface of said cap and a head 105 formed on its outer end in spaced relation with respect to the outer wall of a cap 89 to retain the reaction link 101 to said cap. The opposite end of the amplifying lever 100 has pivotal connection with an outturned end 106 of the reaction link 107, extending through an arm of the spider 81 and pivotally connected thereto on an ear 109, depending from said spider.

It may be seen from the foregoing that the sleeve valve 80 and thermostatic element 85 are floatingly carried in the valve body 70 and that the valve is biased into a closed position by the compression spring 79, which also biases the power member 94 of the thermostatic element in a retracted position. Thus, when the temperature of the coolant reaches the operating range of the thermostatic element 85, the piston or power member 94 will extend from the cylinder 84 and react against the reaction link 101 effecting pivotal movement of the amplifying lever 100 about said link in a counter-clockwise direction, and effecting movement of the sleeve valve 80 in a direction to disengage said sleeve valve from the seating surface 90 of the valve body and to disengage the annular valve portion 92 of said sleeve valve from the lower inner edge of the wall 86 of the valve body 70.

It will be understood that modifications and variations of the present invention may be effected without departing from the spirit and scope of the novel concepts thereof.

I claim as my invention:

1. In a thermostatically operated valve structure, an annular casing defining a fluid flow path axially therethrough, a thermostatic element within said casing and having a cylinder and a piston extensible therefrom upon predetermined increases in temperature, a generally cylindrical valve body extending from said casing and having communication therewith and having a plurality of circumferentially spaced ports leading through the wall thereof and also having a closed top, a sleeve valve movable along said valve body into sealing enegagement with the top and wall thereof, to block the flow of fluid through said ports an amplifying lever connection between said piston and sleeve valve, and a spring biasing said valve toward closed position with respect to said port and biasing said piston toward retracted relation with respect to its cylinder.

2. In a thermostatically operated valve structure, an annular casing defining a fluid flow path axially therethrough, a thermostatic element within said casing and having a cylinder and a piston extensible therefrom upon predetermined increases in temperature, a generally cylindrical valve body extending from said casing and having a wall portion of one diameter adjacent said casing and converging to a wall portion of a smaller diameter remote from said casing having a plurality of circumferentially spaced ports leading therethrough, a sleeve valve slidably guided within said valve body and having a wall portion of one diameter adjacent the outer end portion of said valve body, said sleeve valve diverging to a wall portion of a larger diameter at the inner end of said valve for engagement with the reduced diameter wall portion of said valve body to block the flow of fluid between said wall portions, and an amplifying linkage connection between said thermostatic element and said valve.

3. In a thermostatically operated valve structure, an annular casing, a generally cylindrical valve body extending from said casing, a thermostatic element within said casing and having a cylinder and a piston extensible therefrom upon predetermined increases in temperature, said valve body having an inner wall portion adjacent said casing of one diameter diverging to a wall portion of a smaller diameter extending therealong for a greater portion of the length thereof and having an inwardly recessed closed top, the inner margins of which form a frusto-conical valve seat, a sleeve valve operated by said thermostatic element and movable within said valve body for engagement with said frusto-conical seat to block the passage of fluid thereby, said sleeve valve having a wall portion of one diameter extending inwardly from said seat converging to a wall portion of a larger diameter for engagement with the reduced diameter wall portion of said valve body, to block the passage of fluid therethrough, a spring biasing said sleeve valve into engagement with said frusto-conical seat, and an amplifying link and lever connection between said piston and valve for opening said valve upon extension of said piston from said cylinder.

4. In a thermostatically operated valve structure, an annular casing a valve body having a generally cylindrical wall having ports leading therethrough and closed at its outer end, a thermostatic element carried by said casing and mounted in fixed relation with respect thereto and having a cylinder and a piston extensible therefrom, a sleeve valve movable within said valve body for sealing engagement with the top and wall thereof to block the passage of fluid through said ports, a spring biasing said valve closed, and means operated by extensible movement of said piston from said cylinder upon predetermined increases in temperature for moving said sleeve valve to an open position comprising a pair of links reacting against said valve, a pair of lever arms pivoted to said piston intermediate their ends and having connection with said links at their outer ends and reacting against said valve casing at their opposite ends, and a common spring connected between said valve and casing for biasing said valve in a closed position and said piston in retracted relation with respect to said cylinder.

5. In a thermostatically operated valve structure, an annular valve casing, a valve body extending therefrom and having a generally cylindrical wall having ports leading therethrough, said valve body also having a closed top having an annular seating surface adjacent the margin thereof, a sleeve valve within said body for engagement with said top and wall for blocking the flow of fluid through said ports, a thermostatic element having a cylinder secured to said valve and a piston extensible therefrom, a spring biasing said valve into a closed position and an amplifying leverage connection between said piston and said valve body and valve, for moving said valve and thermostatic element against the bias of said spring into an open position upon predetermined increases in temperature.

6. In a thermostatically operated valve structure, an annular valve casing, a valve body extending therefrom and having a generally cylindrical wall having ports leading therethrough, said valve body also having a closed top having an annular seating surface adjacent the margin thereof, a sleeve valve within said body for engagement with said top and wall for blocking the flow of fluid through said ports, a thermostatic element having a cylinder secured to said valve and a piston extensible therefrom, a spring biasing said valve into a closed position and an amplifying leverage connection between said piston and said valve body and valve, for moving said valve and thermostatic element against the bias of said spring into an open position upon predetermined increases in temperature, comprising a lever pivoted to said piston intermediate its ends, a reaction link connected to said casing at one end and with one end of said lever at its opposite end and a second reaction link connected between the opposite end of said lever and said sleeve valve.

7. In a thermostatically operated by-pass valve structure particularly adapted for the cooling systems of internal combustion engines, an annular casing defining a fluid flow path axially therethrough and having a shoulder, a thermostatic element carried by said casing and having a cylinder and a piston extensible therefrom upon predetermined increases in temperature, a generally cylindrical valve body spaced from said casing, the space between said casing and valve body forming a substantially annular by-pass port peripherally of said casing adjacent the downstream end thereof, said valve body having a cylindrical wall having a plurality of circumferentially spaced ports leading therethrough, a sleeve valve operatively connected to said piston and having slidable engagement with said wall and movable therealong to block the passage of fluid through said ports in one direction of movement and movable into engagement with said shoulder in another direction of movement to admit fluid through said ports, and to block the passage of fluid through said by-pass port.

8. In a thermostatically operated valve structure particularly adapted for the cooling systems of internal combustion engines, an annular casing a valve body spaced from said casing having a generally cylindrical wall with ports leading therethrough and having a closed top having an annular seating surface inwardly of the margin of said wall, said valve casing having a shoulder facing said valve body and extending inwardly of the margin of said wall, the space between said casing and valve body forming a by-pass port, a sleeve valve slidably guided along said valve body for engagement with said annular seat at one end and into engagement with the wall of said valve body, to block the passage of fluid through said port in said wall and movable to an opposite direction into engagement with said shoulder to block the passage of fluid through said by-pass port and accommodate the passage of fluid through said ports in said wall, a thermostatic element carried in said casing and including a cylinder having a piston extensible therefrom, an operative connection between said piston and said sleeve valve for moving said sleeve valve in position to accommodate the passage of fluid through said ports in said wall and to block the passage of fluid through said by-pass port, and a spring biasing said valve into engagement with said annular valve seat and retractibly moving said piston within said cylinder.

9. In a thermostatically operated valve structure particularly adapted for the cooling system of internal combustion engines, an annular casing, a valve body spaced from said casing having a generally cylindrical wall with ports leading therethrough and having a closed top having an annular seating surface inwardly of the margin of said wall, said valve casing having a shoulder facing said valve body and extending inwardly of the margin of said wall, the space between said casing and valve body forming a by-pass port, a sleeve valve slidably guided along said valve body for engagement with said annular seat at one end and into engagement with the wall of said valve body, to block the passage of fluid through said port in said wall and movable to an opposite direction into engagement with said shoulder to block the passage of fluid through said by-pass port and accommodate the passage of fluid through said ports in said wall, a thermostatic element carried in said casing and including a cylinder having a piston extensible therefrom, an operative connection between said piston and said sleeve valve for moving said sleeve valve in position to accommodate the passage of fluid through said ports in said wall and to block the passage of fluid through said by-pass port, and a spring biasing said valve into engagement with said annular valve seat and retractibly moving said piston within said cylinder, the operative connection between said piston and said valve comprising an amplifying lever reacting against said casing, and a link connecting said amplifying lever to said valve.

10. In a thermostatically operated valve structure particularly adapted for the cooling systems of internal combustion engines, an annular casing, a valve body spaced from said casing having a generally cylindrical wall with ports leading therethrough and having a closed top having an annular seating surface inwardly of the margin of said wall, said valve casing having a shoulder facing said valve body and extending inwardly of the margin of said wall, the space between said casing and valve body forming a by-pass port, a sleeve valve slidably guided along said valve body for engagement with said annular seat at one end and into engagement with the wall of said valve body to block the passage of fluid through said port in said wall and movable to an opposite direction into engagement with said shoulder to block the passage of fluid through said by-pass port and accommodate the passage of fluid through said ports in said wall, a thermostatic element carried in said casing and including a cylinder having a piston extensible therefrom, an operative connection between said piston and said sleeve valve for moving said sleeve valve in position to accommodate the passage of fluid through said ports in said wall and to block the passage of fluid through said by-pass port, and a spring biasing said valve into engagement with said annular valve seat and retractibly moving said piston within said cylinder, the operative connection between said valve and piston comprising a pair of amplifying levers pivoted to said piston intermediate their ends for movement about a common axis, reaction links connecting one end of each amplifying lever with said casing to react thereagainst and for forming pivots therefore, and operating links connecting the opposite ends of said amplifying levers with said valve, for slidably moving said valve along said valve body.

References Cited in the file of this patent

UNITED STATES PATENTS

| | | |
|---|---|---|
| 1,639,299 | Kinnard | Aug. 16, 1927 |
| 1,763,802 | Levy | June 17, 1930 |
| 2,356,958 | Wanganheim | Aug. 29, 1944 |

FOREIGN PATENTS

| | | |
|---|---|---|
| 662,977 | Germany | July 26, 1938 |